(12) United States Patent
Li

(10) Patent No.: US 8,558,971 B2
(45) Date of Patent: Oct. 15, 2013

(54) INTEGRATED LIQUID CRYSTAL DISPLAY DEVICE

(75) Inventor: Quan Li, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 69 days.

(21) Appl. No.: 13/376,051

(22) PCT Filed: Sep. 26, 2011

(86) PCT No.: PCT/CN2011/080184
§ 371 (c)(1),
(2), (4) Date: Dec. 2, 2011

(87) PCT Pub. No.: WO2013/037144
PCT Pub. Date: Mar. 21, 2013

(65) Prior Publication Data
US 2013/0063678 A1    Mar. 14, 2013

(30) Foreign Application Priority Data
Sep. 14, 2011    (CN) ...................... 2011 2 0344257 U

(51) Int. Cl.
*G02F 1/13357*    (2006.01)
(52) U.S. Cl.
USPC .............................................. 349/65; 349/58
(58) Field of Classification Search
None
See application file for complete search history.

(56) References Cited

U.S. PATENT DOCUMENTS

| | | | |
|---|---|---|---|
| 6,814,458 B2* | 11/2004 | Kim et al. | ...................... 362/632 |
| 2004/0135936 A1* | 7/2004 | Lee | ................................. 349/64 |
| 2006/0146238 A1* | 7/2006 | Lin et al. | ....................... 349/114 |
| 2006/0274223 A1* | 12/2006 | Hsu | ................................... 349/58 |
| 2007/0146571 A1 | 6/2007 | Nakagawa et al. | |
| 2007/0229725 A1* | 10/2007 | Lee | ................................... 349/58 |
| 2009/0009679 A1* | 1/2009 | Ke et al. | ........................... 349/58 |
| 2009/0096957 A1* | 4/2009 | Hiyama et al. | .................. 349/65 |

(Continued)

FOREIGN PATENT DOCUMENTS

| | | |
|---|---|---|
| CN | 1873492 A | 12/2006 |
| CN | 201368382 Y | 12/2009 |
| JP | 2008299181 A | 12/2008 |
| JP | 2010-251051 A * | 11/2010 |

OTHER PUBLICATIONS

Li Jiantao, the International Searching Authority written comments, Apr. 2012, CN.

*Primary Examiner* — Mike Stahl
(74) *Attorney, Agent, or Firm* — IPro, Inc.; Na Xu

(57) ABSTRACT

The present invention discloses an integrated liquid crystal display (LCD) device, comprising a backlight module, a liquid crystal panel arranged above the backlight module, and a front frame which is arranged at the edge and is shared by the backlight module and the liquid crystal panel; wherein, the position of the front frame corresponding to the backlight module is provided with a reflecting layer. Because the backlight module and the liquid crystal panel of the present invention shares the front frame, and because the position of the front frame which is corresponding to the light emitting diode (LED) is provided with a reflecting layer, LED emitted light that irradiates onto the front frame is reflected by the reflecting layer; the front frame reduces its absorptivity of the LED emitted light, which then favors the reflection of light that irradiates onto the front frame into the LGP or onto the reflection sheet to increase the LED light utilization rate.

16 Claims, 1 Drawing Sheet

(56) References Cited

U.S. PATENT DOCUMENTS

2010/0014018 A1* 1/2010 Chuang et al. .................. 349/58
2010/0053049 A1* 3/2010 Sato et al. ....................... 345/87
2010/0283936 A1* 11/2010 Ji et al. ............................ 349/58
2011/0122650 A1* 5/2011 Osumi et al. .................. 362/606
2011/0128463 A1* 6/2011 Ji et al. ............................ 349/58
2012/0050634 A1* 3/2012 Kim et al. ....................... 349/58

* cited by examiner

INTEGRATED LIQUID CRYSTAL DISPLAY DEVICE

TECHNICAL FIELD

The present invention relates to the field of liquid crystal displays (LCDs), particularly to an integrated LCD device.

BACKGROUND

Many slim designs occur in the market with the pursuit of people for the fashionability of ultra-slim LCD devices. Take the light emitting diode (LED) liquid crystal television as an example, the successful case at present is the integrated (all-in-one) LED liquid crystal television, which integrates the traditional liquid crystal module with the TV system and the degrees of integration of different manufacturers are different to some extent. The liquid crystal module generally comprises a backlight module and a liquid crystal panel arranged above the backlight module; wherein the backlight module generally comprises LED, a light guide plate (LGP) for dispersing and guiding the light of the LED, and a reflection sheet which is arranged under the LGP and is used for reflecting the light irradiating into the reflection sheet back to the LGP. The backlight module and the liquid crystal panel of the integrated liquid crystal television share a front frame to reduce the volume. However, because partial light of the LED of the backlight module is often directly irradiated onto the front frame, and the front frame can absorb the light of the LED of the backlight module of the liquid crystal module, the utilization rate of the LED light is not high.

SUMMARY

The aim of the present invention is to provide an integrated LCD device with higher LED light utilization rate of the LCD module.

The purpose of the present invention is achieved by the following technical schemes. An integrated LCD device comprises a backlight module, a liquid crystal panel arranged above the backlight module, and a front frame which is arranged at the edge and is shared by the backlight module and the liquid crystal panel; wherein the position of the front frame corresponding to the LED of the backlight module is provided with a reflecting layer.

Said reflecting layer is arranged in the position of the front frame above the LED. Because the position above the LED is the major leak position of light, preferable effect can be obtained by arranging the reflecting layer in the position of the front frame above the LED.

Said reflecting layer is a silver reflecting layer. Silver is a frequently-used reflective material with preferable reflection effect.

Preferably, said front frame is of a metal structure. The front frame of metal structure has preferable rigidity, can be used for assisting heat dissipation, and is easy to be processed into a complicated shape.

Preferably, said backlight module is provided with a heatsink plate for LED heat dissipation, and said front frame is thermally communicated with said heatsink plate. Because the front frame is thermally communicated with the heatsink plate, the heat dissipation route is increased, and preferable heat dissipation is performed by the heatsink plate through the metal front frame.

Said front frame is of an integrated step structure, and comprises a first front frame which is corresponding to the edge of the backlight module and a second front frame which is corresponding to the edge of the liquid crystal panel; said second front frame comprises a surface frame arranged above the LED of the backlight module, and a side frame arranged on the side of the backlight module; and said reflecting layer is arranged on the inner side surface of said surface frame. Because the edge of the backlight module is provided with LED, the width of the backlight module in the edge position is often more than the width of the liquid crystal panel; because the edge of the liquid crystal panel is provided with a retractive second front frame, and the front frame of step structure is adapted for the assembly of the liquid crystal panel and the backlight module, the light of the LED can be preferably prevented from directly irradiating into the liquid crystal panel without passing through the LGP; and because the inner side surface of the surface frame of the first front frame at the edge of the backlight module receives more light of the LED, preferable effect can be obtained by arranging a reflection sheet on the inner side surface.

Said backlight module is provided with a heatsink plate for LED heat dissipation; said front frame is a metal front frame; and the inner side surface of the surface frame of the metal front frame is in contact with the heatsink plate of the backlight module. Because the first front frame of the step-shaped surface frame at the edge of the backlight module is just positioned on the side of the heatsink plate, the inner side surface of the surface frame of the metal front frame is in contact with the heatsink plate without greatly changing the structure so that the heatsink plate can preferably dissipate heat through the metal front frame.

Preferably, said reflecting layer is a silver reflecting layer, and the inner side surface of the surface frame of said metal front frame is in contact with the heatsink plate of the backlight module through the silver reflecting layer. The silver reflecting layer has preferable reflection effect, and silver has high thermal conductivity. Thus, the heat of the heatsink plate can be preferably conducted into the front frame, and the heat dissipation efficiency can be increased.

Preferably, said backlight module is provided with a LGP and a reflection sheet, and the surface frame of said metal front frame is arranged in parallel with the LGP or the reflection sheet. Such design makes the reflecting layer of the surface frame be matched with the LGP and the reflection sheet so that the reflection efficiency of the light of the LED becomes higher.

Said integrated LCD device is an integrated liquid crystal television.

Because the backlight module and the liquid crystal panel of the present invention shares the front frame, and because the position of the front frame which is corresponding to the LED is provided with a reflecting layer, LED emitted light that irradiates onto the front frame is reflected by the reflecting layer; the front frame reduces its absorptivity of the LED emitted light, which then favors the reflection of light that irradiates onto the front frame into the LGP or onto the reflection sheet to increase the LED light utilization rate.

Wherein: 1. front frame; 11. first front frame; 12. second front frame; 15. surface frame; 16. side frame; 21. heatsink plate; 22. LED; 23. backplane; 15. LGP; 25. reflection sheet; 26. optical diaphragm; 27. liquid crystal panel; 7. silver reflecting layer.

DETAILED DESCRIPTION

The present invention will further be described in detail in accordance with the figures and the preferred embodiments.

The integrated LCD device of an integrated assembly structure of one embodiment of the present invention comprises a backlight module and a liquid crystal panel arranged above the backlight module; the liquid crystal panel is integrated with the backlight module, and the front frame is shared by the backlight module and the liquid crystal panel; wherein, the position of the front frame corresponding to the LED of the backlight module is provided with a reflecting layer.

Figure 1:
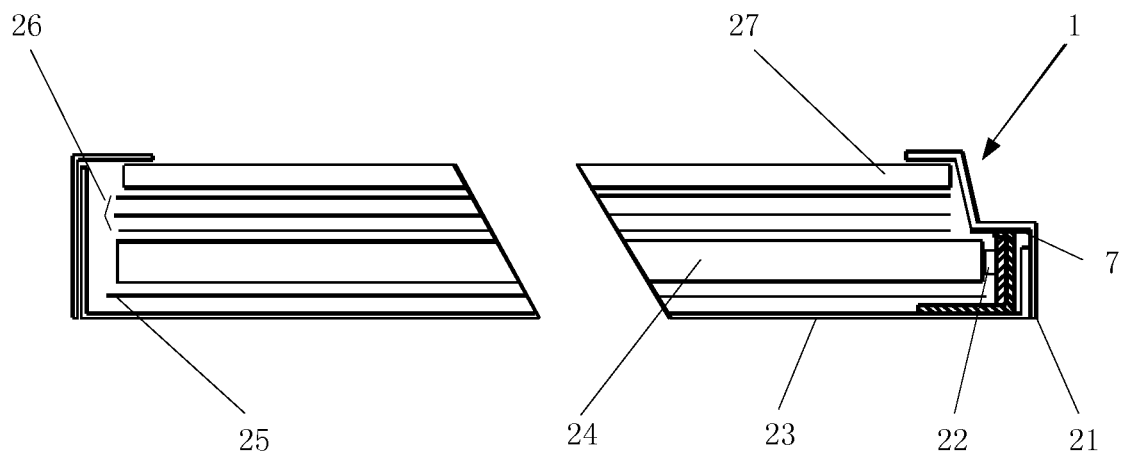
FIG. 1 is the simplified diagram of the embodiment of the present invention.
Figure 2:
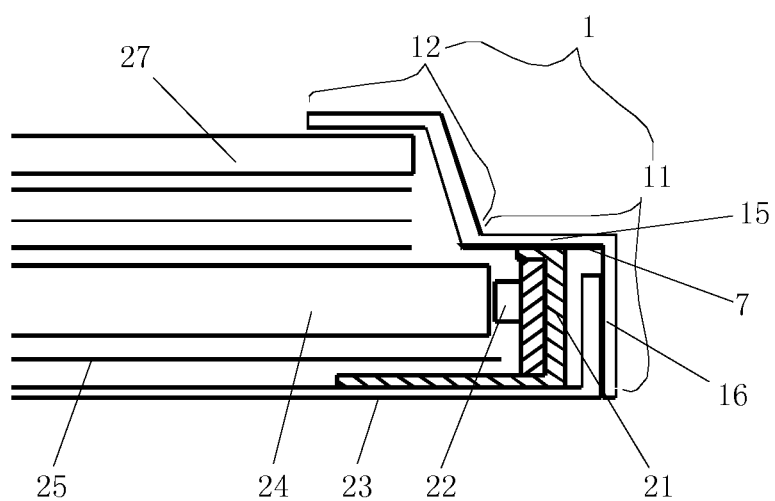
FIG. 2 is the partial view of the embodiment of the present invention.

The integrated liquid crystal television is still used as an example to specifically explain the structure of the integrated LCD device. As shown in FIG. 1 and FIG. 2, the integrated liquid crystal television comprises a backlight module, an optical diaphragm 26 arranged above the backlight module and a liquid crystal panel 27; wherein the backlight module comprises one or more LEDs 22 arranged in the backlight cavity, a backplane 23, a light guide plate 24 for dispersing and guiding the light of the LED 22, and a reflection sheet 25 which is arranged under the LGP 24 and is used for reflecting the light irradiating into the reflection sheet 25 back to the LGP 24. A heatsink plate 21 is arranged below the LED 22 and is used for dissipating the heat of the LED 22.

As shown in FIG. 2, the front frame 1 is of an integrated step structure, and comprises a first front frame 11 which is corresponding to the edge of the backlight module and a second front frame 12 which is corresponding to the edge of the liquid crystal panel 27; both the first front frame 11 and the said second front frame 12 are in an L shape or a similar shape; said second front frame 12 comprises a surface frame 15 which is arranged above the LED 22 of the backlight module, and a side frame 16 which is arranged on the side of the backlight module; the surface frame 15 is positioned above the LED 22, and the inner side surface of the surface frame 15 of the first front frame 11 is provided with a silver reflecting layer 7 for reflecting light in order to prevent the first front frame 11 from absorbing the light emitted by the LED 22. Thus, the light emitted by the LED 22 is reflected into the LGP 24 and the reflection sheet 25 to increase the utilization rate of light of the LED 22. Of course, the reflecting layer can be arranged in other position of the front frame 1 corresponding to the position of the LED 22, and the LED light utilization rate can be increased as long as the position is irradiated by the LED light.

In addition, the surface frame 15 of the first front frame 11 can be arranged in relatively parallel with the LGP 24 or the reflection sheet 25. Such design makes the silver reflecting layer 7 of the surface frame 15 be matched with the LGP 24 and the reflection sheet 25, so that the reflection efficiency of the light emitted by the LED 22 becomes higher.

The step-shaped front frame 1 is designed by mainly considering the conditions because the edge of the backlight module is provided with LED 22; the width of the backlight module in the edge position is often more than the width of the liquid crystal panel 27; because the edge of the liquid crystal panel 27 is provided with a retractive second front frame 12, and the front frame 1 of step structure is adapted for the assembly of the liquid crystal panel 27 and the backlight module, the light of the LED 22 can be preferably prevented from directly irradiating into the liquid crystal panel 27 without passing through the LGP 24; and because the inner side surface of the surface frame 15 of the first front frame 11 at the edge of the backlight module receives more light of the LED 22, preferable effect can be obtained by arranging a reflection sheet 25 on the inner side surface. Of course, the front frame can be in other shapes.

Because most area of the front frame 1 is exposed to the air, if the front frame 1 is used as the heatsink assembly of the backlight module, the temperature of the backlight module can be effectively reduced. While metal is a material with preferable heat-conducting property and is easy to machine into the aforementioned complicated step shape, the front frame 1 of the embodiment selects the metal front frame, and the inner side surface of the surface frame 15 of said metal front frame 1 is in contact with the heatsink plate 21 of the backlight module. As shown in FIG. 1 and FIG. 2, because the first front frame 11 of the step-shaped front frame 1 at the edge of the backlight module is just positioned on the side above the upper end of the heatsink plate 21, the inner side surface of the surface frame 15 of the metal front frame 1 is in contact with the heatsink plate 21 without greatly changing the structure. Thus, the heatsink plate 21 directly conducts heat to the front frame 1, and then the front frame 1 dissipates heat into air. Therefore, heat can be preferably dissipated by the heatsink plate 21 through the metal front frame 1; the heat dissipation efficiency is increased, and the internal temperature of the liquid crystal television is reduced. Because the thermal conductivity of silver is high (429 w/m.k), while the thermal conductivity of general rolled steel is 60 w/m.k, the thermal conductivity of silver is higher than that of the general rolled steel; the embodiment can achieve better reflection effect and better heat conduction effect by using the silver reflecting layer 7 as a reflecting layer. Of course, said silver reflecting layer can also be replaced by other reflecting layers, such as some materials with higher reflection efficiency, including aluminium, high molecular polymer and the like, and the purpose of the present invention can be achieved as long as preferable reflection effect can be achieved.

Said reflecting layer can be electroplated onto said front frame, and can be coated onto said front frame as well.

The present invention is described in detail in accordance with the above contents with the specific preferred embodiments. However, this invention is not limited to the specific embodiments. For example, the aforementioned integrated LCD device is not limited to the integrated (All-in-one) liquid crystal television, and it can be used in other integrated LCD devices, such as integrated (All-in-one) LED monitors and the like. For the ordinary technical personnel of the technical field of the present invention, on the premise of keeping the conception of the present invention, the technical personnel can also make simple deductions or replacements, and all of which should be considered to belong to the protection scope of the present invention.

I claim:

1. An integrated liquid crystal display (LCD) device, comprising: a backlight module, a liquid crystal panel arranged above the backlight module, and a front frame which is arranged at an edge of the backlight module and the liquid crystal panel and is shared by the backlight module and the liquid crystal panel; the position of the front frame corresponding to the backlight module is provided with a reflecting layer; wherein the backlight module comprises at least one LED arranged in a backlight cavity and a light guide plate (LGP) for dispersing and guiding light of the at least one LED, and the side of the LGP is a light incident surface, an light emitting surface of the at least one LED is parallel with the light incident surface of the LGP.

2. The integrated LCD device of claim 1, wherein said reflecting layer is arranged in the position of the front frame above the light emitting diode (LED).

3. The integrated LCD device of claim 1, wherein said reflecting layer is a silver reflecting layer.

4. The integrated LCD device of claim 1, wherein said front frame is a metal front frame.

5. The integrated LCD device of claim 2, wherein said front frame is a metal front frame.

6. The integrated LCD device of claim 3, wherein said front frame is a metal front frame.

7. The integrated LCD device of claim 4, wherein said backlight module is provided with a heatsink plate for LED heat dissipation, and said front frame is thermally communicated with said heatsink plate.

8. The integrated LCD device of claim 5, wherein said backlight module is provided with a heatsink plate for LED heat dissipation, and said front frame is thermally communicated with said heatsink plate.

9. The integrated LCD device of claim 6, wherein said backlight module is provided with a heatsink plate for LED heat dissipation, and said front frame is thermally communicated with said heatsink plate.

10. The integrated LCD device of claim 1, wherein said front frame is of an integrated step structure, and comprises a first front frame which is corresponding to the edge of the backlight module and a second front frame which is corresponding to the edge of the liquid crystal panel; said second front frame comprises a surface frame arranged above the LED of the backlight module, and a side frame arranged on the side of the backlight module; said reflecting layer is arranged on the inner side surface of said surface frame.

11. The integrated LCD device of claim 10, wherein said backlight module is provided with a heatsink plate for LED heat dissipation; said front frame is a metal front frame; and the inner side surface of the surface frame of the metal front frame is in contact with the heatsink plate of the backlight module.

12. The integrated LCD device of claim 11, wherein said reflecting layer is a silver reflecting layer.

13. The integrated LCD device of claim 10, wherein said backlight module is further provided with a reflection sheet which is arranged under the LGP, and the surface frame of said metal front frame is arranged in parallel with the light guide plate (LGP) or the reflection sheet.

14. The integrated LCD device of claim 11, wherein said backlight module is further provided with a reflection sheet which is arranged under the LGP, and the surface frame of said metal front frame is arranged in parallel with the LGP or the reflection sheet.

15. The integrated LCD device of claim 12, wherein said backlight module is further provided with a reflection sheet which is arranged under the LGP, and the surface frame of said metal front frame is arranged in parallel with the LGP or the reflection sheet.

16. The integrated LCD device of claim 1, wherein said integrated LCD device is an integrated liquid crystal television.

* * * * *